Nov. 19, 1968     J. W. DAVIS     3,411,835

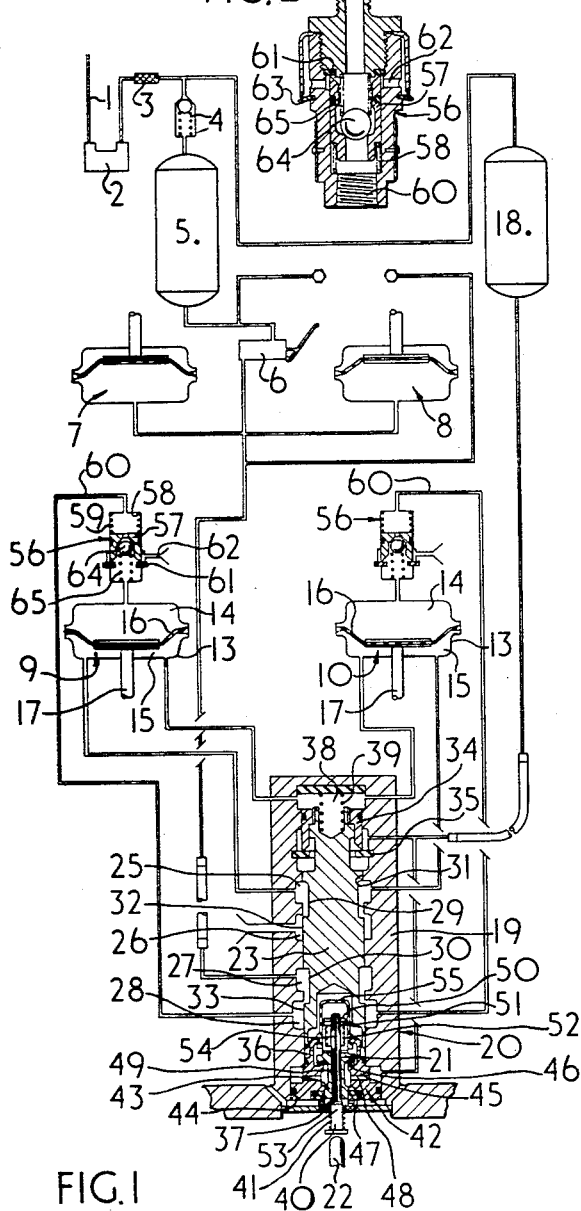

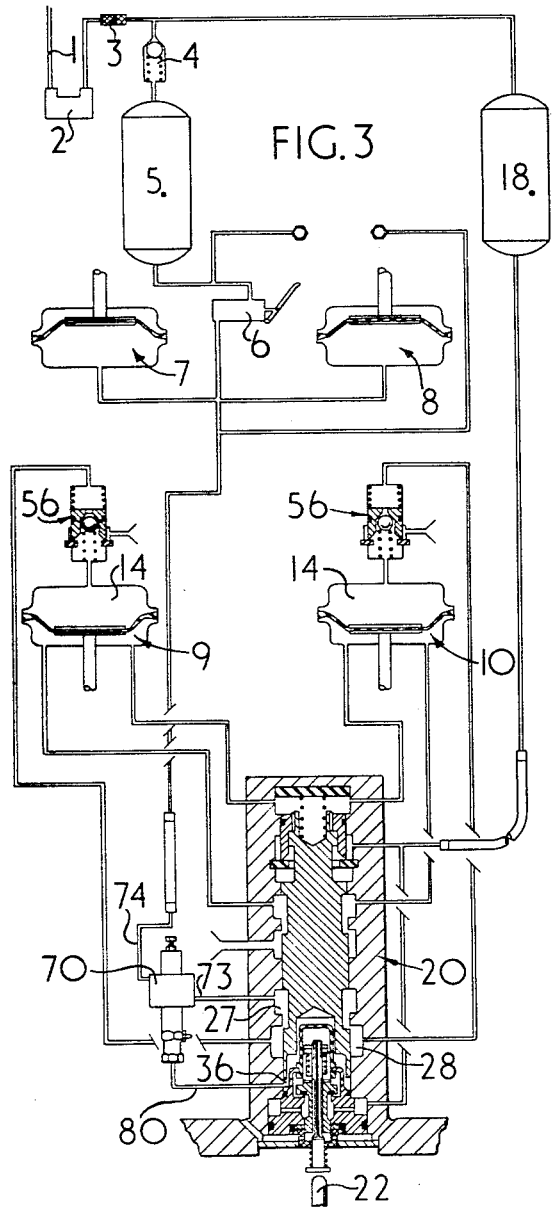

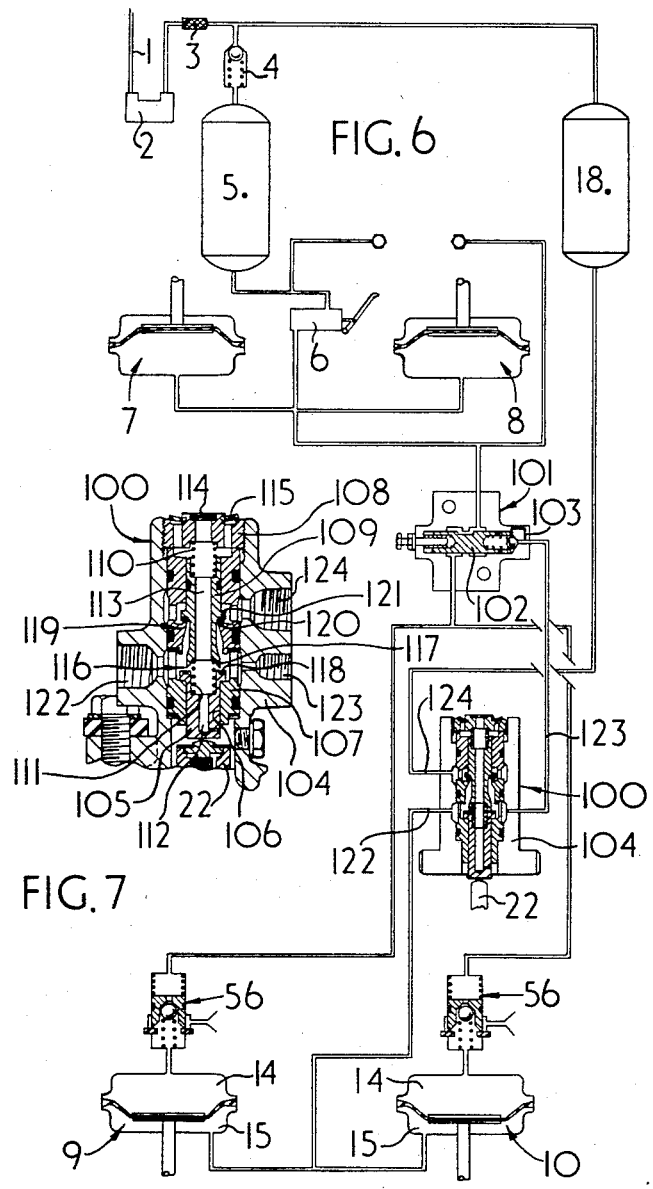

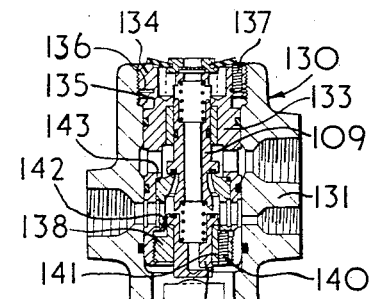
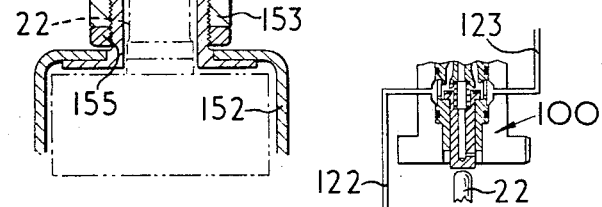
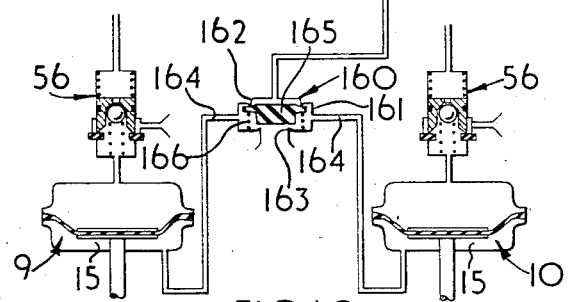

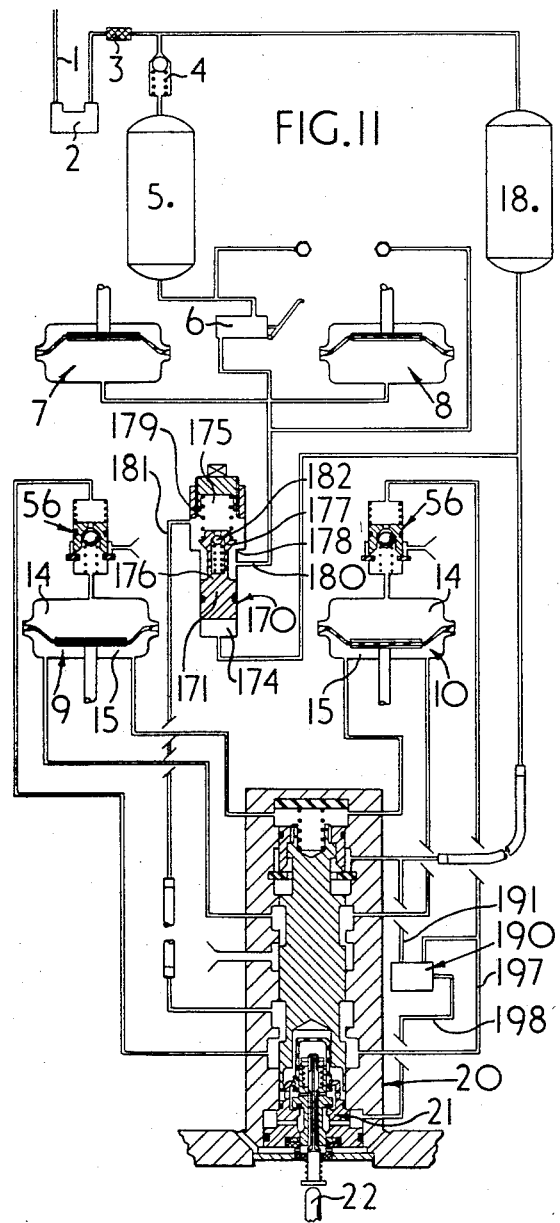

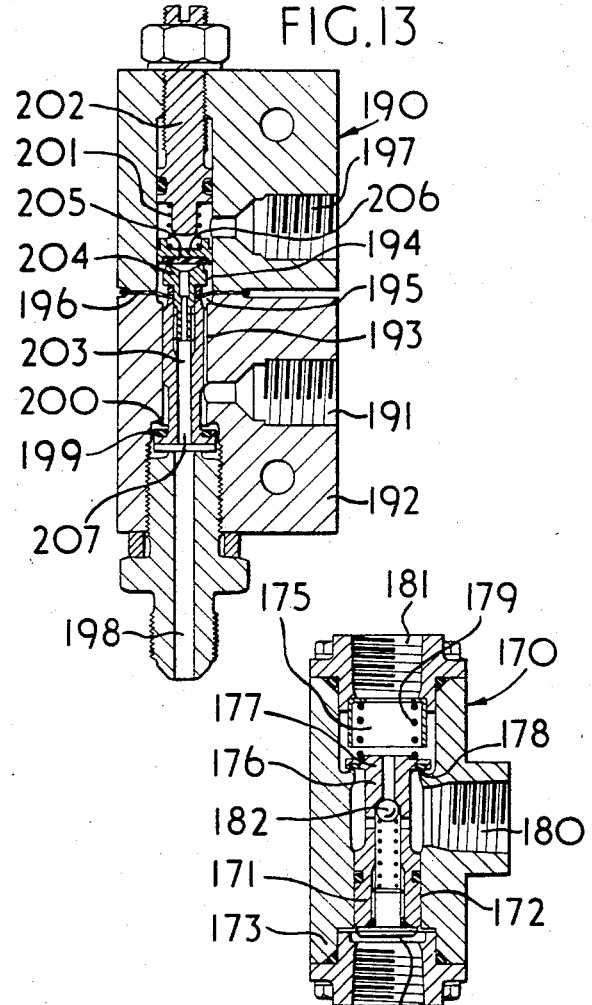

VEHICLE ANTI-SKID BRAKING SYSTEMS

Filed July 7, 1966     11 Sheets-Sheet 10

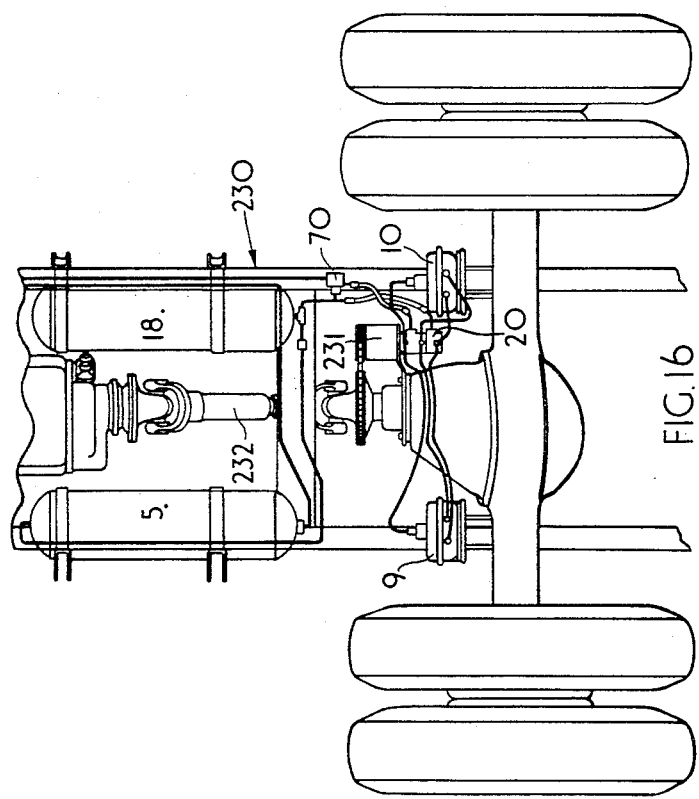

United States Patent Office 3,411,835
Patented Nov. 19, 1968

3,411,835
VEHICLE ANTI-SKID BRAKING SYSTEMS
John Walter Davis, Coventry, England, assignor to The Dunlop Company Limited, London, England, a corporation of Great Britain
Filed July 7, 1966, Ser. No. 563,600
Claims priority, application Great Britain, July 15, 1965, 29,998/65
35 Claims. (Cl. 303—21)

ABSTRACT OF THE DISCLOSURE

A fluid pressure braking system for vehicles which incorporates a skid-sensing device which controls the supply of fluid pressure to a brake-releasing chamber forming a part of the brake operating mechanism to effect release of the brakes. The system also includes means associated with the brake-applying chamber of the brake-operating mechanism to release excess pressure from the working chamber.

---

This invention relates to vehicle anti-skid braking systems, and particularly to systems of the kind which incorporates a skid-sensing device arranged to release at least one of the brakes of the vehicle whenever an associated wheel is about to lock and skid or is rotating at any speed other than ground speed.

In a pneumatic vehicle braking system the action of releasing the brakes tends to be slow in operation, since it is normally necessary to exhaust a large volume of fluid from the working chambers of the brake operating mechanisms. When a low braking pressure is being used, the rate at which it can be released is particularly slow. This adversely affects the working of an anti-skid system which requires very rapid release and re-application of the brakes for efficient operation.

One object of the present invention is to provide a vehicle anti-skid braking system in which a rapid rate of release and re-application of the brakes can be achieved.

According to the invention, a vehicle braking system comprises a fluid brake operating mechanism having a first working chamber which can be subjected to fluid pressure or vacuum from a source thereof under the control of a driver-operated control valve to produce a thrust to apply a brake and a second working chamber which can be supplied with fluid pressure or vacuum from a second source to produce a thrust in opposition to the thrust from the first working chamber to effect a reduction in the resultant thrust applied to the brake, an anti-skid control valve having a brake-applying position in which it connects the second working chamber to atmosphere and a brake-releasing position in which it connects the second working chamber to the second source of fluid-pressure or vacuum to cause it to oppose the brake-applying thrust, and a skid-sensing device associated with a wheel of the vehicle and arranged to move the control valve to the brake-releasing position whenever the wheel tends to lock and to permit the return of the valve to the brake-applying position when the tendency for the wheel to lock has been overcome.

According to the invention also a vehicle braking system comprises a pneumatic brake operating mechanism having a first working chamber which can be subjected to fluid pressure from a source thereof under the control of a driver-operated control valve to produce a thrust to apply a brake and a second working chamber which can be supplied with fluid pressure from a second source to produce a thrust in opposition to the thrust from the first working chamber to effect a reduction in the resultant thrust applied to the brake, an anti-skid control valve having a brake-applying position in which it connects the second working chamber to atmosphere and a brake-releasing position in which it connects the second working chamber to the second source of fluid pressure to cause it to oppose the brake-applying thrust, and a skid-sensing device associated with a wheel of the vehicle and arranged to move the control valve to the brake-releasing position whenever the wheel tends to lock and to permit the return of the valve to the brake-applying position when the tendency for the wheel to lock has been overcome, a balanced exhaust valve being connected to the first working chamber and being arranged to release pressure therefrom when the pressure in the first working chamber tends to increase as a result of operation of the second working chamber to apply a thrust in opposition to the thrust from the first working chamber.

The invention also provides a tractor portion of an articulated vehicle having a braking system as defined in either of the preceding paragraphs. The skid-sensing device may be driven from the propeller shaft of the tractor portion and the anti-skid control valve may be employed to control the operation of brake operating mechanisms associated with the rear wheels of the tractor portion.

In a preferred system in accordance with the invention, the anti-skid control valve is a single-stage valve arranged to control the pressure in the second working chamber of the brake operating mechanism and a sensitivity control valve is provided to reduce the rate at which air pressure is supplied to the first chamber of the brake operating mechanism when the anti-skid control valve operates. The anti-skid control valve may alternatively be a two-stage valve comprising a primary fluid-pressure valve of relatively small capacity which is directly actuated by the skid-sensing device to control the operation of a pneumatically-operated secondary or servo-valve of larger capacity which controls the passage of fluid to or from the second working chamber.

Also, in a preferred system according to the invention the first and second working chambers are formed in a common housing with a displaceable pressure sensitive member, such as a piston or flexible diaphragm, separating the two working chambers and subjected on one side to the pressure in the first working chamber and on the other side to the pressure in the second working chamber.

A number of embodiments of the invention will now be described, by way of example, with reference to the accompanying drawings, in which:

FIGURE 1 is a diagrammatic illustration of a braking system in accordance with the invention for a tractor portion of an articulated vehicle;

FIGURE 2 is a cross-sectional view of a balanced exhaust valve;

FIGURE 3 is a diagrammatic illustration of an alternative braking system in accordance with the invention incorporating a sensitivity control valve;

FIGURE 6 is a diagrammatic illustration of a braking system in accordance with the invention in which the anti-skid control valve is a single-stage valve;

FIGURE 7 is a cross-sectional view of a single-stage anti-skid control valve;

FIGURES 8 and 9 are cross-sectional views showing alternative forms of the single-stage control valve;

FIGURE 10 is a diagrammatic illustration of part of a braking system in accordance with the invention incorporating a quick-release valve;

FIGURE 11 is a diagrammatic illustration of a braking system in accordance with the invention incorporating a pressure limiting valve and a pressure differential valve;

FIGURE 12 is a cross-sectional view of a pressure limiting valve;

FIGURE 13 is a cross-sectional view of a pressure differential valve;

FIGURE 16 is a plan view of a vehicle having a skid-control valve mounted therein in which the skid-sensing device is driven from a propeller shaft.

Figure 1A:
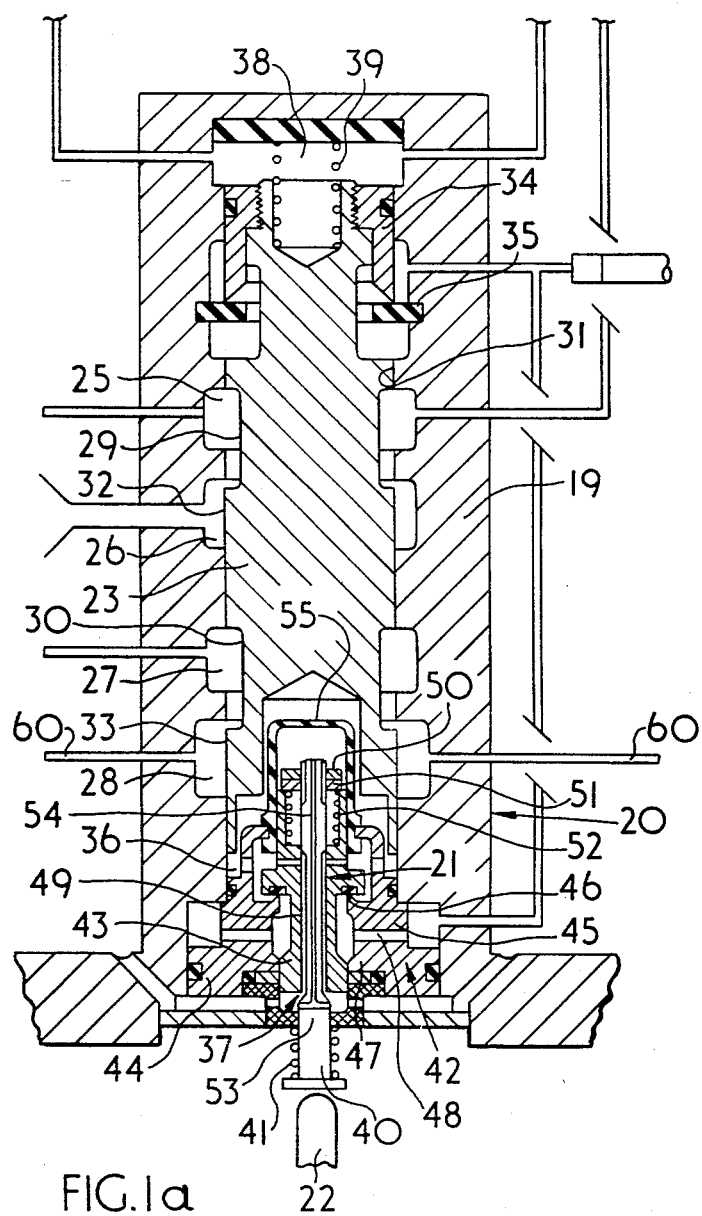
FIGURE 1A is an enlarged sectional view of a two-stage anti-skid control valve. Also shown in FIGURE 1.

A fluid pressure braking system for the tractor portion of an articulated vehicle 230 as illustrated in FIGURE 1 comprises a compressor (not shown) arranged to supply air pressure through a supply line 1, unloader valve 2, filter 3 and non-return valve 4 to charge a compressed air service reservoir 5 to a predetermined pressure, the reservoir 5 being connected via the driver's brake control valve 6 to the four wheel brake operating mechanisms 7, 8, 9, 10 of the tractor. The operating mechanisms 7, 8 of the front wheel brakes are conventional air chambers which are operated in the normal manner by the driver's control valve, and a trailer service line 11 and emergency line 12 are also provided in the normal manner, but the rear wheel brake operating mechanisms 9, 10 and connections thereto are modified by the provision of an anti-skid system designed to reduce the danger of skidding of the rear wheels and the consequent tendency for the tractor and semi-trailer portions of the vehicle to "jack-knife."

The rear brake operating mechanisms 9, 10 each comprise a housing 13 containing first and second working chambers 14, 15 separated by a displaceable pressure sensitive member in the form of a flexible diaphragm 16 having a brake operating rod 17 attached to its centre. The first working chamber 14 of each mechanism is normally connected, through means to be described, to the driver's control valve and can be supplied with penumatic pressure to operate the brake. The second working chamber 15 is normally connected, through means to be described, to atmosphere and means is provided for admitting a skid-correcting pressure to the second chamber 15 to oppose the pressure in the first chamber 14 and thus to reduce the resultant thrust applied to the associated brake when a skid is imminent.

The skid-correcting pressure is derived from a second or anti-skid reservoir 18 which is charged to a predetermined pressure by the compressor and which is separated from the service reservoir by the non-return valve 4 to provide a second source of pneumatic pressure for anti-skid purposes which is independent of the brake operating system.

The connections to both chambers of each of the brake operating mechanisms 9, 10 are made through ports of the secondary portion 19 of a two-stage anti-skid control valve 20, the primary valve 21 of which is actuated mechanically by a thrust member 22 which forms part of a rotary-inertia skid-sensing device 231 of conventional form driven from the vehicle's transmission shaft 232. A suitable skid-sensing device is described in the specification of our co-pending U.K. patent application No. 36,195/65.

The arrangement of the connections to the secondary valve ports of the anti-skid control valve 20, in the two position of the valve, is as follows:

In the normal brake-applying position of the secondary valve as shown in FIGURE 1, when skidding is not imminent, the first chamber 14 of each of the brake operating mechanisms 9 and 10 is connected to the driver's control valve and the second chamber 15 is connected to atmosphere.

In the brake-releasing position of the secondary valve, the supply of pressure from the driver's control valve 6 to the first chamber 14 of each of the brake operating mechanisms 9, 10 is cut off and the second reservoir 18 is connected to supply pneumatic pressure to the second chamber 15 of each of the brake operating mechanisms to provide a rapid brake-releasing action.

The secondary portion 19 of the anti-skid control valve 20 comprises a spool valve member 23 which is slidable axially in a cylindrical bore of a housing 24 having ports in the form of annular groves 25, 26, 27, 28 in the wall of the housing which co-operate with corresponding grooves 29, 30 and lands 31, 32, 33 formed on the valve member 23 to provide the required changes in the connections to the chambers of the brake operating mechanisms as the spool valve member 23 slides from the brake-applying to the brake-releasing position. The groove 25 is connected to the second chamber 15 of each operating mechanism, the groove 26 to exhaust, the groove 27 to the driver's control valve 6, and the groove 28 to the first chamber of the brake operating mechanism through a balanced exhaust valve to be described.

The ports controlling the connections to the first chamber are formed solely by the grooves 27, 28 and 30 and land 33 as described above, but an additional cylindrical poppet valve member 34 is provided to improve the seal and prevent long-term leakage of air from the connection to the second reservoir 18. The poppet valve member 34 is secured to the spool valve member 23 and seats on an annular rubber valve seat member 35 fixed coaxially in the wall of the valve bore. Initial movement of the spool member causes the poppet valve to open but air is stopped from flowing to the second chamber 15 by the land 31 on the spool 23 until the spool 23 has moved a sufficient distance to close the connection of the second chamber 15 to atmosphere through annular groove 26.

Movement of the spool member is effected by pressure differences arising at the opposite ends of the valve bore; one end 36 of the bore adjacent the skid-sensing device is normally connected through an exhaust valve 37, forming part of the primary valve 21, to atmospheric pressure, and the other end 38 is connected to the second chamber 15 of each brake operating mechanism 9, 10, which is also at atmospheric pressure, the spool member 23 being urged towards the end 36 by a spring 39. The primary valve mechanism includes a valve stem 40 urged by a spring 41 towards the skid-sensing device and engageable by the thrust member 22 of the skid-sensing device which, when a skid is imminent, presses the valve stem 40 axially towards the opposite end 38 of the valve. This movement of the valve stem closes the exhaust valve 37 and opens an inlet valve 42 which is connected to the second reservoir 18.

The inlet valve 42 comprises a primary valve member 43 axially displaceably mounted within an end member 44 which seals the end 36 of the cylindrical bore of the anti-skid control valve 20. The end member 44 has an inner wall 45 which includes a seat 46 for the member 43 and an outer wall 47 in which the member 43 is axially slidably mounted. An air pressure inlet 48 connected to the second reservoir 18 is provided between the walls 45 and 47. The valve member 43 has a coaxial bore 49 through which the valve stem 40 passes, the stem 40 having locknuts 50, 51 at its axially inner end abutting the primary valve member and a spring 52 located in a recess at the end of the primary valve member.

The valve stem has an enlarged portion 53 at its outer end which is engageable with the end of the bore 49 of the primary valve member 43 to close the exhaust valve 37, and is bored to provide an axial bleed passage 54 which serves to balance the pressures acting at opposite ends of the valve stem and the primary valve member 43. The inner end of the primary valve member is surrounded by a cup-shaped member 55 which is carried by the inner wall 45 of the end member 44 and is arranged to provide a sealed chamber connected by the bleed passage 54 to exhaust.

When an imminent skid is sensed by the skid-sensing device the pressure supplied to the adjacent end 36 of the valve bore moves the spool valve member 23 from the brake-applying position to the brake-releasing position. This effects the required changes in the air pressure connections as set out above and causes the diaphragms 16 of the rear brake operating mechanisms to be moved so as to release the brakes. There would be a tendency for pressure to build up in the first chamber 14 of each brake operating mechanism as the diaphragm was moved to reduce its volume, but this is prevented by the provision, in the line connecting each first chamber to the anti-skid control valve 20, of a balanced exhaust valve 56 constructed as follows:

The balanced exhaust valve 56 comprises a valve member in the form of a piston 57 movable against a spring 58 in a cylinder 59 which is connected at one end to the first chamber 14 and at the other end by a line 60 to the anti-skid control valve 20. The piston 57 is normally held against a valve seat 61 to close an exhaust port 62 provided with a rubber flap valve 63, and is arranged so that any increase in pressure within the first chamber 14 beyond a predetermined level relative to the level existing before the skid was initiated opens the exhaust port to allow air to escape from the chamber. A non-return ball valve 64 within the piston 57, urged to a closed position by a spring 65 permits free passage of air through the piston 57 towards the chamber 14 while not permitting the escape of air therefrom.

In the operation of the system described above to check an imminent rear-wheel skid, when the brakes are applied the pressure in each first chamber 14 rises until an imminent skid is sensed. The anti-skid control valve 20 then seals off the supply of air pressure to the first chamber, but allows the existing pressure to remain, both in the first chamber and in the line 60 connecting its balanced exhaust valve 56 to the anti-skid control valve. Any subsequent rise in pressure in the first chamber, resulting from movement of the diaphragm 16, which is sufficient to overcome the combined pressure of the spring 58 and the pressure in the line 60 will move the piston 57 from its seat 61 and allow the excess pressure to escape through the exhaust port 62.

The brake-releasing action of the system described above thus causes little interference with the pressure existing in the first chamber before the skid-correcting operation, and this enables the brakes to be re-applied quickly and with very little drain on the reserve of compressed air in the service reservoir. However, when braking on a slippery surface, if the driver depresses his brake control pedal to a greater extent than is necessary, the pressure in the chambers 14 will be raised to successively higher pressures following each brake releasing operation. This causes correspondingly greater amounts of air to be supplied to the second chambers 15 from the second reservoir 18 to check each successive tendency to skid. There is a danger in this circumstance that the pressure in the second reservoir 18 may fall below that in the reservoir 5 since larger volumes of air are required to effect release of the brake, and insufficient pressure may become available to release the brakes. The alternative system shown in FIGURE 3 incorporates a sensitivity control valve 70 which, after the anti-skid control valve 20 has operated to effect release of the brakes, provides a restricted flow of air to the chambers 14 of the brake operating mechanisms. Apart from the insertion of the sensitivity control valve 70 the system shown in FIGURE 3 is identical with that shown in FIGURE 1, and will therefore not be described in detail.

Figure 4:
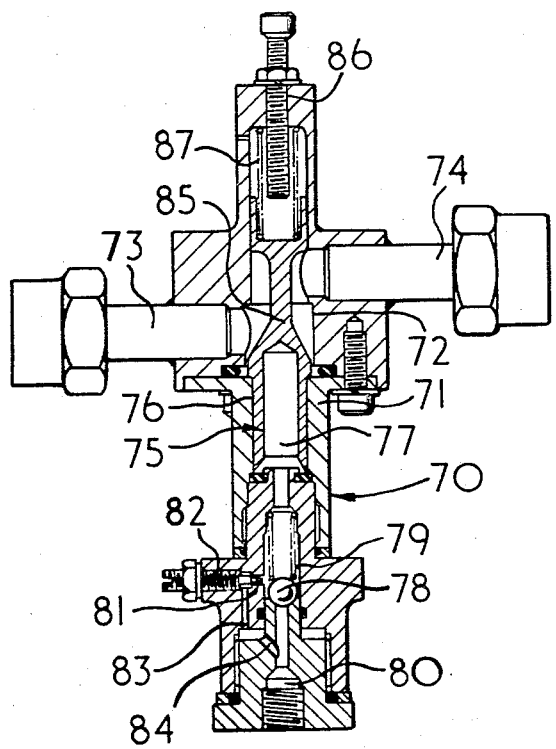
FIGURE 4 is a cross-sectional view of a sensitivity control valve.

The sensitivity control valve 70 comprises a housing 71 containing a passage 72 having an outlet port 73 and an inlet port 74 connected respectively to the groove 27 of the anti-skid control valve 20 and the driver-operated control valve 6 (see FIGURE 4). A restrictor member 75 is slidable within the passage 72 to provide a variable restriction to the flow of air through the passage, the restrictor member comprising a piston portion 76 which is arranged to be subjected to air pressure at the end 77 of the passage 72 whenever the anti-skid control valve 20 operates to check an imminent skid. The end 77 forms the control end of the passage and is connected through a non-return valve 78 urged to a closed position by a spring 79, and through a line 80 to the end 36 of the bore of the anti-skid control valve 20. An orifice 81 which is adjustable in size by means of a tapered needle valve member 82 is connected by passages 83 and 84 to provide a bleed passage which, following an operation of the system to check an imminent skid, when the anti-skid control valve 20 returns to the brake applying position and thus connects the end 36 of the bore of the anti-skid control valve 20 to exhaust, enables the pressure at the control end 77 of the passage 72 to leak at a predetermined rate to exhaust.

The restrictor member 75 has a waisted central portion 85 of tapering cross-section, which is movable from the position shown in FIGURE 4 by pressure at the end 77 of the passage 72 to a position between the inlet and outlet ports in which it provides a relatively great restriction to the flow of air from the driver's control valve 6 to the chambers 14 of the brake operating mechanisms 9 and 10 whenever the anti-skid control valve operates and feeds pressure to the end 77 of the passage 72. The opposite end of the passage 72 contains an adjustable stop 86 and a return spring 87 which urges the restrictor member towards a position in which it provides a relatively small restriction, and when the operation of the anti-skid control valve to check a skid ceases, thus connecting the line 80 to exhaust, the spring 87 moves the restrictor member 75 towards the position shown in FIGURE 4, the pressure at the end 77 of the passage 72 escaping through the adjustable orifice 81 to exhaust. The orifice 81 is adjusted to delay the return of the restrictor member until sufficient time has elapsed for at least one cycle of operation of the anti-skid system to take place, thus ensuring that the rate of flow of air to the chambers 14 of the brake operating mechanisms is insufficient to cause a significant rise in pressure in the chambers 14 during a period when the anti-skid control valve is operating cyclically to apply and release the brakes.

Figure 5:
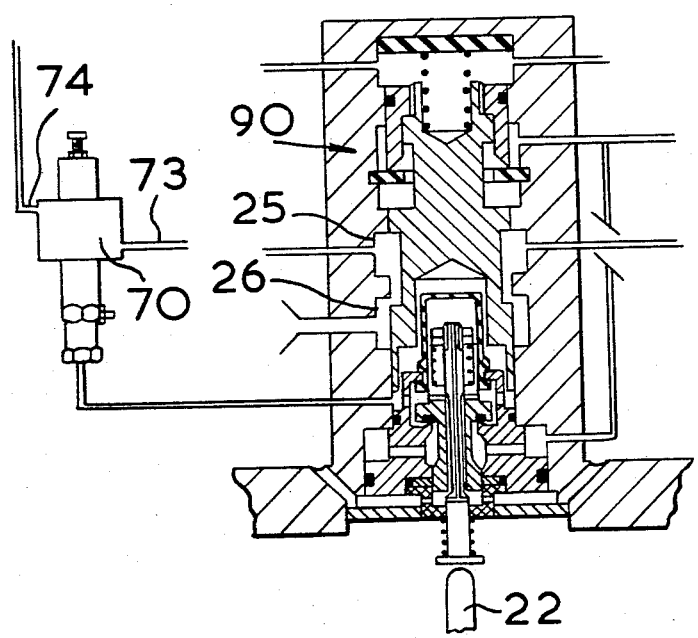
FIGURE 5 is a cross-sectional view showing a modifier anti-skid control valve and a sensitivity control valve.

When the sensitivity control valve 70 is provided it is possible to dispense with the control of the brake applying pressure afforded by the anti-skid control valve, and instead to route the brake applying pressure directly to the chambers 14 through the sensitivity control valve 70. Such an arrangement is shown in FIGURE 5: the ports constituted by grooves 27, 28 are omitted from the anti-skid control valve 90 which is in all other respects similar to the anti-skid control valve 20, and the outlet 73 of the sensitivity control valve is connected directly to the balanced exhaust valves 56 (not shown in FIGURE 5).

The provision of a sensitivity control valve as described above keeps the pressure in the chambers 14 at a relatively low level on slippery surfaces, and thus reduces the amount of air which needs to be supplied to the second chambers 15 of the brake operating mechanisms in a skid-correcting operation. The pressure difference between the reservoir 18 and the chambers 15 remains at a high value throughout the operation, and the flow of air through the anti-skid control valve therefore takes place under a high pressure differential. This enables a smaller anti-skid control valve to be used than would be required for passing an air flow at a relatively low pressure differential, as would occur in a situation in which the chambers 15 had to be raised to a pressure near to that of the reservoir 18.

The system shown in FIGURE 6 is similar to the system shown in FIGURE 3, except that instead of the two-stage anti-skid control valve 20 a single-stage valve 100 is provided, and the same reference numerals have been used where applicable. In the system shown in FIGURE 6, the flow of air to the brake-applying chambers 14 of the brake operating mechanisms 9, 10 is controlled while an anti-skid operation is in progress by a sensitivity control valve 101 which is of the kind shown in FIGURE 4 but which incorporates a restrictor member 102 of slightly different shape and has a non-adjustable bleed passage 103.

The single-stage valve 100 (see FIGURE 7) comprises a housing 104 associated with a skid-sensing device which incorporates a thrust member 22 engageable with a first plunger 105 axially slidably mounted in a bore 106 formed in a sleeve 107 secured in the housing 104 by a screw-threaded end member 108.

A second plunger 109 is slidably mounted in the bore 106 so as to be coaxially aligned with the first plunger 105, and a spring 110 is located between the plunger 109 and the end member 108 to urge the plunger 109 towards the thrust member 22. A spring 111 mounted between the plungers 105 and 109 urges the respective plungers to an axially separated condition and thus together with the spring 110 forms spring means which urges the two plungers towards the thrust member 22 of the skid-sensing device. The plunger 105 has an axial bore 112 connected to atmosphere through a corresponding bore 113 of the plunger 109 which communicates with a gauze filter 114 and a rubber flap valve 115 arranged to provide a relatively unobstructed outlet for the release of air from the bore 113.

A first valve 116 of the anti-skid control valve comprises a first valve member 117 and a first valve seat 118 formed respectively on the adjacent ends of the plungers 109, 105. A second valve 119 comprises a second valve member 120 and a second valve seat 121 formed respectively on the sleeve 107 and the second plunger 109. The first valve 116 is in communication with the second chambers 15 of the operating mechanisms 9, 10 through a line 122 and with the control end of the sensitivity control valve 101 through a line 123. The second valve 119 is in communication with the reservoir 18 through a line 124.

The arrangement of the valve 100 is such that the first plunger 105 is movable by the thrust member 22 from a brake-applying position in which the first valve 116 is open and the second valve 119 is closed, to a brake-releasing position in which the first valve 116 is closed by movement of the first plunger 105 to engage the second plunger 109 and the second valve is opened by movement of the second plunger 109. Closure of the first valve seals the chambers 15 from atmosphere and the opening of the second valve allows air pressure to pass from the reservoir 18 to the line 122 and thence to the chambers 14 to effect release of the brake. Simultaneously, as in the system shown in FIGURE 3, the control end of the sensitivity control valve 101 is subjected to air pressure through the line 123 to cause the valve 101 to restrict the flow of air to the chambers 14.

When the thrust member 22 moves back to allow the valve 100 to return to the brake-applying position, air is exhausted rapidly from the chambers 15 through the open valve 116, bore 113 and flap valve 115.

FIGURES 8 and 9 show alternative forms of the single-stage anti-skid control valve described above, which differ in the means provided for setting an appropriate clearance in the first valve and for setting an appropriate clearance between the first plunger 105 and the thrust member 22. The valves of FIGURES 8 and 9 are of a similar general form to that shown in FIGURE 7 and the same reference numerals have been used where applicable.

In the valve 130 shown in FIGURE 8, the housing 131 is integral with the housing 132 of the skid-sensing device. The plungers 105 and 109 are slidable in a detachable sleeve 133 which has a screw-threaded end portion 134 received in a screw-threaded portion of a bore 135 in the housing. The end portion 134 includes an annular recess 136 into which a locking screw 137 is screwed to lock the sleeve in a predetermined axial position in the bore 135 so as to set the clearance of the plunger 105 from the thrust member 22. The clearance of the first valve 116 is set before the sleeve 133 is inserted into the bore 135 by means of an axially adjustable screw-threaded end member 138 of the sleeve which is received in a screw-threaded bore 139 of the sleeve and can be locked in any axial position by means of a locking screw 140 which is screwed through a screw-threaded hole 141 in the end member 138 to engage one end of a detachable annular component 142 of the sleeve 133 which itself abuts a shoulder 143 of the sleeve at its other end.

The valve 150 shown in FIGURE 9 comprises a housing 151 which is axially adjustably secured to the housing 152 of the skid-sensing device by means of a screw-threaded portion 153 engaging a correspondingly screw-threaded extension 154 of the housing 152 and is locked in position thereon by a locknut 155 to provide the appropriate clearance between the plunger 105 and the thrust member 22. The plunger 105 is supported in one end member 156 which is also in screw-threaded engagement with the portion 153 of the housing 152 and can be locked in position therein, before assembly of the valve 150 on to the housing 152, by means of a locking screw 157.

FIGURE 10 shows a portion of a similar system to that shown in FIGURE 6 which incorporates a quick-release valve 160. The valve 160 is provided to permit air in the second chambers 15 to flow rapidly to exhaust when the anti-skid control valve 100 moves to the brake-applying position following a skid-correcting operation of the system. The quick-release valve 160 comprises a chamber 161 having at one end an inlet valve seat 162 connected by a line 122 to the anti-skid control valve, the line 122 serving to convey air pressure from the second reservoir to the chambers 15 in the brake-releasing position of the anti-skid control valve.

At the opposite end of the chamber 161 an exhaust valve seat 163 is provided, and a pair of side connections 164 lead to the chambers 15. A rubber valve member 165 is urged by a spring 166 towards the inlet valve seat 162, the arrangement being such that air pressure in the line 22 will move the member 165 from the seat 162 and into engagement with the seat 163 so as to allow the air pressure to pass to the chambers 15: when the pressure in the line 122 is released to atmosphere by movement of the valve 100 to the brake-releasing position, the member 165 will be moved by the spring 166 to open the exhaust valve seat and thus permit a rapid release of air from the chambers 18.

In an alternative embodiment shown in FIGURES 11 and 12 a pressure limiting valve 170 is incorporated to ensure that the pressure supplied by the driver's control valve 6 to each rear brake-applying mechanism cannot exceed a predetermined level slightly below the pressure in the second reservoir 18.

The valve 170 comprises a cylindrical plunger 171 sliding in a bore 172 in a valve housing 173 and arranged to be subjected at one end 174 to the pressure of the second reservoir and at the other end 175 to the pressure supplied to the anti-skid control valve 20 by the driver's control valve 6. The plunger 171 carries an axially projecting stem 176 on which a valve head 177 is provided for engagement with a seat 178 formed in the mid-portion of the valve housing 173, the effective diameter of the valve seat 178 being equal to the diameter of the plunger 171, and is urged by a spring 179 towards a position in which the valve is closed. An inlet 180 from the driver's control valve 6 is provided in the wall of the valve bore between the plunger 171 and the valve seat 178 and an outlet 181 to the anti-skid control valve 20 is provided in the wall of the valve bore 172 on the side of the valve seat 178 remote from the inlet 180.

The arrangement is such that the valve head 177 is urged towards a closed position by the pressure from the driver's control valve and towards the open position by the pressure from the second reservoir. When the thrust on the plunger 171 arising from the pressure in the second reservoir 18 is lower than the combined thrust arising from the action of the spring 179 and the pressure from the driver's control valve, the valve closes to prevent any further increase in the brake-applying pressure. This ensures that there is always a greater pressure available to cause release of the brakes than the pressure available to apply the brakes.

A non-return valve 182 is provided in the valve head 177 to permit air to flow back to the driver's control valve 6 to effect brake release in the normal manner when the driver reduces the pressure output from the control valve.

The embodiment shown in FIGURE 11 also includes a pressure differential valve 190 (shown in detail in FIGURE 13) in the line 191 from the second reservoir 18 which feeds the primary valve portion 21 of the anti-skid control valve 20. The purpose of the pressure differential valve 190 is to relate the pressure supplied for skid-correction, to the second chambers 15 of the brake-applying mechanisms 9, 10, to the pressure which has been supplied to the first chambers 15 to apply the brakes, so as to avoid any tendency for excessive pressure to be supplied to the second chambers beyond that required to release the brakes, with the consequent danger of excessive air consumption from the reservoir 18.

The pressure differential valve 190 comprises a body 192 having a bore 193 divided into two chambers 194 and 195 by a diaphragm 196 and having side inlet ports connected, respectively, to the line 197 from the anti-skid control valve 20 to the first chamber 14 of one of the brake-applying mechanisms 9, 10, and to the line 191 from the second reservoir which in the embodiments described above supplies compressed air directly from the second reservoir to the primary valve portion 21 of the anti-skid control valve. An outlet 198 through which air can pass to the primary valve portion 21 of the anti-skid control valve 20 is provided at one end of the pressure differential valve 190, and is arranged so that it can be closed by a valve member 199 attached to the diaphragm and engageable with a seat 200 formed in the bore.

The arrangement is such that the valve member 199 is urged away from its seat 200 by a spring 201 supported on a stop member 202 at the opposite end of the bore 193 and by the brake application pressure acting on the diaphragm 196, and towards its seat by the pressure from the second reservoir 18. When the pressure from the reservoir 18 exceeds the brake application pressure by a predetermined amount the valve member 199 closes on its seat and prevents further rise in the pressure fed through line 198 to the primary stage 21 of the anti-skid control valve 20. This, in turn, has the effect of limiting the pressure which can be fed to the second chambers 15 of the brake-applying mechanisms.

When the valve member 199 is seated to prevent further passage of air to the anti-skid control valve and the brake-applying pressure is released by the driver the pressure remaining in the primary valve portion 21 of the anti-skid control valve 20 must be allowed to escape. This is achieved by the provision of a bore 203 through the valve member 199 which is normally sealed at its end 204 within the chamber associated with the brake pressure line by a rubber disc 205 held in a cup 206 which is slidable in the chamber 194 and urged towards the valve member 199 by the spring 201. The open end 207 of the bore 203 always communicates with the outlet 198 whatever position the valve member may adopt, and on release of the brake pressure by the driver the pressure in the primary valve portion 21 of the anti-skid control valve 20 can unseat the rubber disc 205 and escape to exhaust.

Figure 14:
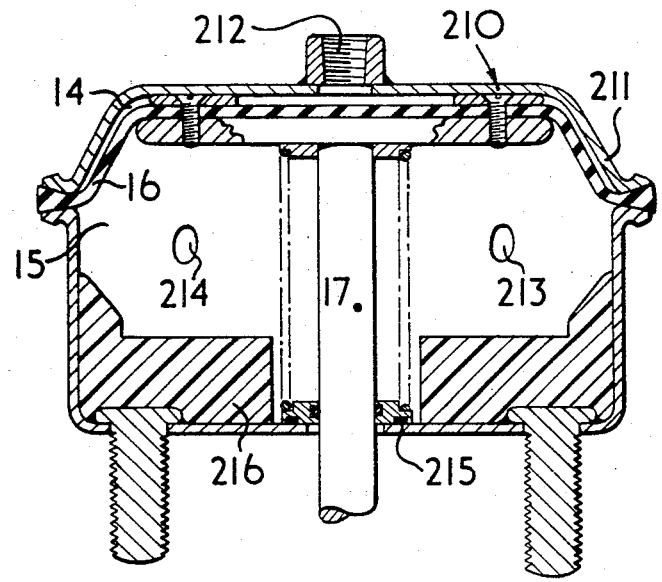
FIGURE 14 is a cross-sectional view of a brake operating mechanism.

In the embodiments described above the brake operating mechanisms 9, 10 may each take the form of a conventional mechanism, modified as shown in FIGURE 14. The mechanism 210 shown in FIGURE 14 comprises a housing 211 containing a first working chamber 14 and a second working chamber 15 separated by a diaphragm 16 having a brake operating rod 17 attached to its centre in the conventional manner. An inlet 212 for pressure from the control valve 6 is provided in the wall of the chamber 14 and ports 213 and 214 are formed in the wall of the chamber 15 for connections to the anti-skid control valve. The chamber 15 is sealed by a sealing member 215 through which the rod 17 is slidable. A filling member 216 is provided in the chamber 15 to adjust its volume to approximately the same amount as that of the chamber 14.

Figure 15:
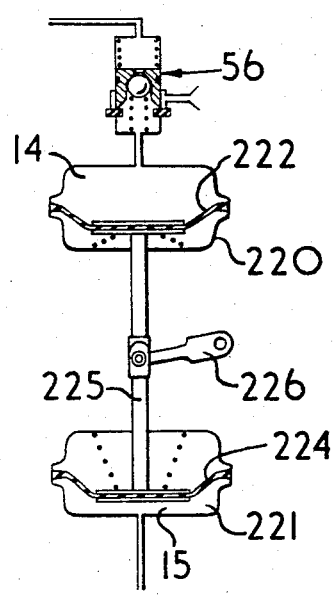
FIGURE 15 is a diagrammatic illustration of an alternative brake operating mechanism.

The alternative brake operating mechanism shown in FIGURE 15 comprises a pair of housings 220, 221, the housing 220 containing the first working chamber 14 and the housing 221 containing the second working chamber 15.

Although the present invention has been illustrated and described in connection with certain selected example embodiments, it will be understood that these are illustrative of the invention and are by no means restrictive thereof. It is reasonably to be expected that those skilled in the art can make numerous revisions and adaptations of the invention and it is intended that such revisions and adaptations will be included within the scope of the following claims as equivalents of the invention. The diaphragms 222 and 224 are coupled to a common operating rod 225 which actuates a brake operating lever 226.

While in the embodiments described above the system according to the invention is operated by pneumatic pressure, the system could readily be modified to operate by vacuum, and the invention includes within its scope a vacuum-operated system. Hydraulic operating means may also be interposed between the brake-operating mechanisms described above and the brakes without departing from the scope of the present invention.

Having now described my invention, what I claim is:
1. A vehicle braking system comprising a fluid pressure brake operating mechanism having a first working chamber which can be subjected to fluid pressure under the control of a driver-operated control valve to produce a thrust to apply a brake and a second working chamber which can be supplied with fluid pressure to produce a thrust in opposition to the thrust from the first working chamber to effect a reduction in the resultant thrust applied to the brake, an anti-skid control valve having a brake-applying position in which it connects the second working chamber to atmosphere and a brake-releasing position in which it connects the second working chamber to the second source of fluid pressure to cause it to oppose the brake-applying thrust, and means for maintaining a relatively constant pressure in said first working chamber while pressure is supplied to said second working chamber in a manner effecting release of the brake.

2. A vehicle braking system comprising a pneumatic brake operating mechanism having a first working chamber which can be subjected to pneumatic pressure from a source thereof under the control of a driver-operated control valve to produce a thrust to apply a brake and a second working chamber which can be supplied with pneumatic pressure from a second source to produce a thrust in opposition to the thrust from the first working chamber to effect a reduction in the resultant thrust applied to the brake, an anti-skid control valve having a brake-applying position in which it connects the second working chamber to atmosphere and a brake-releasing position in which it connects the second working chamber to the second source of pneumatic pressure to cause it to oppose the brake-applying thrust, a skid-sensing device associated with a wheel of the vehicle and arranged to move the control valve to the brake-releasing position whenever the wheel tends to lock and to permit the return of the valve to the brake-applying position when the tendency for the wheel to lock has been overcome, and a balanced exhaust valve connected to the first working chamber and being arranged to release pressure therefrom when the pressure in the first working chamber tends to increase as a result of operation of the second working chamber to apply a thrust in opposition to the thrust from the first working chamber.

3. A vehicle braking system according to claim 2 wherein the balanced exhaust valve comprises an exhaust valve member arranged normally to be held by a spring and by pressure from a pneumatic pressure supply line acting on one side thereof against a valve seat to close an exhaust port, the other side of the exhaust valve member being subjected to the pressure within the first working chamber and the arrangement being such that when the pressure in the first working chamber rises by a predetermined amount above the pressure in the supply line the exhaust valve member is unseated to permit pressure from the first working chamber to escape to exhaust.

4. A vehicle braking system according to claim 3 wherein the exhaust valve member incorporates a spring-loaded non-return valve arranged to permit free passage of air towards the first working chamber while not permitting the escape of air therefrom.

5. A vehicle braking system according to claim 2 wherein the anti-skid control valve is a two-stage valve comprising a primary valve of relatively small capacity which is arranged to be directly actuated by the skid-sensing device to control the operation of a pneumatically operated servo valve of larger capacity which is arranged to control the passage of air to or from the second working chamber.

6. A vehicle braking system according to claim 5 wherein the anti-skid control valve comprises a control valve housing having a spool valve member which is slidable axially in a cylindrical bore of he housing and is urged by a spring towards a brake-applying position at one end of the bore, the spool valve and its bore having cooperating annular grooves and lands which in the brake-applying position serve to connect the second working chamber to exhaust, the spool valve member being slidable towards a brake-releasing position at the opposite end of the cylindrical bore in which position the spool valve member connects the second working chamber to a source of pneumatic pressure.

7. A vehicle braking system according to claim 6 wherein the primary valve of the anti-skid control valve is located at the end of the cylindrical bore towards which the spool valve member is urged by its spring, the primary valve being connected to a source of air pressure and being operable by the skid-sensing device to allow pressure to enter the associated end of the cylindrical bore to effect movement of the spool valve member towards the opposite end of the bore, the opposite end of the bore being connected to the second working chamber of the brake operating mechanism.

8. A vehicle braking system according to claim 7 wherein the primary valve comprises a primary valve member axially displaceably mounted within an end member which closes the associated end of the cylindrical bore of the anti-skid control valve, the end member having an inner wall which includes a seat for the primary valve member and an outer wall through which the primary valve member is axially slidable and an air pressure inlet between the inner and outer walls, the primary valve member having a coaxial bore through which a valve stem passes, a spring being provided to urge the valve outwardly and the valve stem normally abutting the primary valve member at its inner end to urge the primary valve member axially outwardly into engagement with its seat to prevent air pressure from entering the associated end of the cylindrical bore of the anti-skid control valve, and the valve stem having an enlarged portion at its outer end, the enlarged portion being engageable with the primary valve member and the valve stem being movable by a thrust member associated with the skid-sensing device to move the primary valve member to an open position.

9. A vehicle braking system according to claim 8 wherein the bore through the primary valve member provides a conection to exhaust for the associated end of the cylindrical bore in the closed position of the primary valve, the enlarged portion of the valve stem serving to close the connection to exhaust when the valve stem is moved inwardly to open the primary valve.

10. A vehicle braking system according to claim 8 wherein the inner wall of the end member carries a cup-shaped member extending into the cylindrical bore to provide a sealed chamber in which the inner end of the primary valve member is slidable, the valve stem projecting into the sealed chamber and having an axial bleed passage connected to exhaust at its outer end and to the sealed chamber at its inner end to balance the pneumatic pressures acting at opposite ends of the valve stem.

11. A vehicle braking system according to claim 8 wherein the spool valve member comprises a poppet valve including a cylindrical poppet valve member coaxially mounted thereon and engageable in the brake-applying position with a resilient annular valve seat member secured in the wall of the cylindrical bore and projecting radially inwardly into the bore to provide a seating surface for the poppet valve member on one radial face of the seat member, the poppet valve being arranged to provide an additional seal to prevent leakage of air through the anti-skid control valve from the second source of air pressure.

12. A vehicle braking system according to claim 2 wherein the source of pneumatic pressure for effecting application of the brakes is a service reservoir supplied from a compressor and the second source of pneumatic pressure is a separate anti-skid reservoir supplied from the compressor, a non-return valve being provided between the service reservoir and the anti-skid reservoir to prevent the passage of air from the service reservoir to the anti-skid reservoir.

13. A vehicle braking system according to claim 5 wherein the spool valve member and the cylindrical bore of the anti-skid control valve have co-operating annular grooves and lands which in the brake-applying position serve to connect the first working chamber to the driver's control valve and in the brake-releasing position seal the first working chamber from the driver's control valve.

14. A vehicle braking system according to claim 2 wherein a sensitivity control valve is provided to reduce the rate at which air pressure is supplied to the first chamber of the brake operating mechanism when the anti-skid control valve operates, the sensitivity control valve comprising a housing containing a passage having inlet and outlet ports through which pneumatic pressure may flow to the first chamber and a restrictor member slidable within the passage to provide a variable restriction to the flow of air through the passage, means being provided to move the restrictor member to a position in which it provides a relatively great restriction when the anti-skid control valve operates to effect release of the brake and to return the restrictor member to a position in which it provides a relatively small restriction after a pre-determined time following the movement of the anti-skid control valve to the brake-applying position.

15. A vehicle braking system according to claim 14 in which the restrictor member is spring-urged towards a control end of the passage which is arranged to be connected through a non-return valve to air pressure from the second source when the anti-skid control valve is operated by the skid-sensing device, the pressure supplied to the control end of the passage being arranged to effect movement of the restrictor member towards a position in which it provides a relatively great restriction and a bleed passage being provided to enable the pressure at the control end of the passage to leak at a predetermined rate to exhaust when the anti-skid control valve returns to the brake-applying position.

16. A vehicle braking system according to claim 15 wherein the bleed passage includes an adjustable orifice to enable the rate of flow of air through the bleed passage to be adjusted.

17. A vehicle braking system according to claim 15 in which the restrictor member comprises a piston portion which is arranged to be subjected to air pressure at the control end of the passage, the inlet and outlet ports being formed in the wall of the passage in axially separated positions and the restrictor member having a waisted central portion of tapering cross-section which is arranged to be moved into the region of the passage between the inlet and outlet ports by the said air pressure at the control end of the passage.

18. A vehicle braking system according to claim 14 wherein the outlet port of the sensitivity control valve is connected directly to said balanced exhaust valve.

19. A vehicle braking system according to claim 12 wherein the anti-skid control valve is a single-stage valve comprising a housing associated with the skid-sensing device and having a first plunger axially slidably mounted in a bore thereof for engagement with a thrust member of the skid-sensing device and a second plunger slidably mounted in a housing and coaxially aligned with the first plunger, spring means to urge the two plungers towards the skid-sensing device and to urge the respective plungers to an axially separated condition, the plungers having an axial bore connected to atmosphere, a first valve constituted by a first valve member and a first valve seat formed respectively on the adjacent ends of the plungers and a second valve constituted by a second valve member and a second valve seat formed respectively on the housing and the second plunger, the first valve being in communication with the second chamber of the operating mechanism and the second valve being in communication with the second source of pneumatic pressure and the arrangement being such that the first plunger is movable by the thrust member of the skid-sensing device from a brake-applying position in which the first valve is open and the second valve is closed to a brake-releasing position in which the first valve is closed and the second plunger is moved by the first plunger to open the second valve to allow air pressure to pass from the second source to the second chamber of the brake operating mechanism.

20. A vehicle braking system according to claim 19 wherein the axial bore through the second plunger communicates with atmosphere through a filter and also through a flap valve arranged to provide a relatively unobstructed outlet for the rapid release of air from the second chamber of the brake operating mechanism.

21. A vehicle braking system according to claim 19 wherein the housing of the anti-skid control valve is integral with the housing of the skid-sensing device and comprises a detachable sleeve in which the plungers are slidable, the first plunger being supported in an end member of the sleeve which is axially adjustable and capable of being locked in position relative to the sleeve to set the clearance of the first valve, and the sleeve being axially adjustable and being capable of being locked in position in the anti-skid control valve housing to set the clearance of the first plunger from the thrust member of the skid-sensing device.

22. A vehicle braking system according to claim 19 wherein the housing of the anti-skid control valve is axially adjustably secured to the housing of the skid-sensing device and is capable of being locked in position to set the clearance of the first plunger from the thrust member of the skid-sensing device and the first plunger is supported in an end member which is axially adjustable relative to the housing of the anti-skid control valve and is capable of being locked in position therein to set the clearance of the first valve.

23. A vehicle braking system according to claim 2 wherein a quick-release valve is provided to permit air in the second chamber to flow to exhaust when the anti-skid control valve moves to the brake-applying position, the quick-release valve comprising a chamber having at one end an inlet valve seat connected to the anti-skid control valve and at the opposite end an exhaust valve seat connected to atmosphere and having a side connection to the second working chamber, and a quick-release valve member urged by a spring towards the inlet valve seat, the arrangement being such that air pressure from the anti-skid control valve will move the quick-release valve member from the inlet valve seat and into engagement with the exhaust valve seat, to allow said air pressure to pass to the second chamber, and when the anti-skid control valve operates to connect the said inlet valve seat to atmosphere the quick-release valve member will be moved by its spring to open the exhaust valve seat.

24. A vehicle braking system according to claim 2 wherein a pressure limiting valve is provided to prevent the brake-applying pressure fed to the first working chamber of the brake operating mechanism from becoming greater than the pressure available from the second source to effect release of the brake and wherein the pressure limiting valve comprises a limiting valve housing having a plunger slidable in a bore thereof and arranged to be subjected at one end to the pressure from the second source and at the other end to the pressure supplied to the first chamber of the brake operating mechanism, the plunger being associated with a valve arranged to control the flow of air pressure to the first chamber of the brake, the said valve being arranged to be closed by movement of the plunger whenever the pressure supplied to the said first chamber tends to rise above the pressure available from the second source.

25. A vehicle braking system according to claim 24 wherein the plunger is formed with an axially projecting stem having a valve head engageable with a valve seat formed in the mid-portion of the limiting valve housing, an inlet from the driver-operated control valve being provided between the plunger and the valve seat, an outlet for air pressure to be fed to the first chamber of the brake operating mechanism being provided on the side of the valve seat remote from the inlet and a connection to the second source being provided on the side of the plunger remote from the valve seat, a spring being provided to urge the plunger towards a position in which the valve head engages the valve seat.

26. A vehicle braking system according to claim 25 wherein a non-return valve is provided in the head of the pressure limiting valve and is arranged to permit air to return from the first chamber of the brake operating mechanism to effect release of the brake when the pressure supplied thereto from the driver-operated control valve is reduced.

27. A vehicle braking system according to claim 2 wherein a pressure differential valve is provided to relate the pressure supplied to the second chamber of the brake operating mechanism to the pressure supplied to the first chamber to apply the brake, so as to prevent excessive pressure being supplied to the second chamber beyond that required to release the brake and wherein the pressure differential valve comprises a body having a bore divided by a diaphragm into two chambers having inlet ports connected respectively to the supply of air pressure to the first chamber and the second source, a valve member being attached to the diaphragm so as to be movable by the diaphragm to operate a valve arranged to control the supply of air pressure from the second source to the second chamber.

28. A vehicle braking system according to claim 27 wherein the end of the valve member associated with the chamber of the pressure differential valve connected to the second source has an enlarged head for engagement with a valve seat formed at the adjacent end of the said bore, a spring being provided at the opposite end of the bore to urge the valve member towards the open condition in which air is permitted to flow from the second source to an outlet so as to cause air to be supplied to the second chamber.

29. A vehicle braking system according to claim 28 wherein the valve member has an axial passage extending therethrough and wherein the spring associated with the valve member is arranged to press a closure member against the adjacent end of the said passage, the arrangement being such that on reduction of the air pressure supplied to the first chamber pressure at the outlet of the pressure differential valve can escape past the closure member.

30. A vehicle braking system according to claim 27 wherein the anti-skid control valve is a two-stage valve comprising a primary valve which is arranged to be supplied with pressure from the outlet of the pressure differential valve.

31. A vehicle braking system according to claim 1 wherein the brake operating mechanism comprises a housing containing the first and second working chambers, the chambers being separated by a displaceable pressure sensitive member subjected on one side to the pressure in the first working chamber and on the other side to the pressure in the second working chamber and coupled to operate the brake.

32. A vehicle braking system according to claim 1 wherein the brake operating mechanism comprises a pair of housings one containing the first working chamber and the other containing the second working chamber, the housings being provided respectively with displaceable pressure sensitive members which are both coupled to means for operating the brake.

33. A vehicle braking system according to claim 1 wherein at least two brake operating mechanisms are arranged to be controlled by a single skid-sensing device and a single associated anti-skid control valve.

34. A tractor portion of an articulated vehicle including a braking system according to claim 1, wherein the skid-sensing device is driven from a propeller shaft which drives the rear wheels of the tractor portion, and wherein the anti-skid control valve is arranged to control the operating mechanisms of the rear wheel brakes.

35. A vehicle braking system comprising a fluid-pressure brake operating mechanism having a first working chamber which can be subjected to vacuum from a source thereof under the control of a driver-operated control valve to produce a thrust to apply a brake and a second working chamber which can be subjected to vacuum to produce a thrust in opposition to the thrust from the first working chamber to effect a reduction in the resultant thrust applied to the brake, an anti-skid control valve having a brake-applying position in which it connects the second working chamber to atmosphere and a brake-releasing position in which it connects the second working chamber to the second source of vacuum to cause it to oppose the brake-applying thrust and a skid-sensing device drivably associated with a wheel of the vehicle and arranged to move the control valve to the brake-releasing position whenever the wheel tends to lock and to permit the return of the valve to the brake-applying position when the tendency for the wheel to lock has been overcome, and means for maintaining a relatively constant pressure in said first working chamber when said second working chamber is subjected to vacuum to effect release of the brake.

References Cited

UNITED STATES PATENTS

| | | | |
|---|---|---|---|
| 2,868,338 | 1/1959 | Lucien et al. | 188—181 |
| 3,203,516 | 8/1965 | Stelzer | 188—181 |
| 3,306,677 | 2/1967 | Dewar et al. | 303—21 |
| 3,312,509 | 4/1967 | Highley | 303—21 |

DUANE A. REGER, *Primary Examiner.*